United States Patent [19]
Yoon et al.

[11] Patent Number: 6,088,794
[45] Date of Patent: Jul. 11, 2000

[54] COMPUTER SYSTEM CAPABLE OF SELECTIVE BOOTING FROM TWO HARD DISK DRIVES

[75] Inventors: Ji-Seob Yoon; Sung-Dong Yang; Kwan-Ho Lee, all of Suwon, Rep. of Korea

[73] Assignee: SamSung Electronics Co., Ltd., Kyungki-do, Rep. of Korea

[21] Appl. No.: 09/127,037

[22] Filed: Jul. 31, 1998

[30] Foreign Application Priority Data

Jul. 31, 1997 [KR] Rep. of Korea .................. 97-36651

[51] Int. Cl.[7] .................................................. G06F 9/445
[52] U.S. Cl. .................................................. 713/2
[58] Field of Search ........................... 713/1, 2, 100

[56] References Cited

U.S. PATENT DOCUMENTS

| | | |
|---|---|---|
| 4,530,052 | 7/1985 | King et al. . |
| 4,626,986 | 12/1986 | Mori . |
| 5,134,580 | 7/1992 | Bertram et al. . |
| 5,278,973 | 1/1994 | O'Brien et al. . |
| 5,361,358 | 11/1994 | Cox et al. . |
| 5,414,860 | 5/1995 | Canova, Jr. et al. . |
| 5,452,455 | 9/1995 | Brown et al. . |
| 5,471,615 | 11/1995 | Amatsu et al. . |
| 5,524,245 | 6/1996 | Zarrin et al. . |
| 5,535,411 | 7/1996 | Speed et al. . |
| 5,604,890 | 2/1997 | Miller .................................. 395/500.44 |
| 5,655,154 | 8/1997 | Jain et al. . |
| 5,673,403 | 9/1997 | Brown et al. . |
| 5,694,600 | 12/1997 | Khenson et al. . |
| 5,715,456 | 2/1998 | Bennett et al. . |
| 5,778,171 | 7/1998 | Rahman et al. . |
| 6,003,131 | 12/1999 | Lee et al. .................................. 713/2 |

*Primary Examiner*—Thomas M. Heckler
*Attorney, Agent, or Firm*—Robert E. Bushnell, Esq.

[57] ABSTRACT

A computer system having two fixed disk drives and with a different operating system stored in each disk drive, in which selective booting and suspend/resume operation of the power management can be preformed through the two fixed disk drives. The computer system comprises a first hard disk drive storing a first operating system and a second hard disk drive storing a second operating system, each of the first and second hard disk drive has a reserved data storage area for the suspend operation. A port exchanger intervenes in the master and slave integrated drive electronics (IDE) interface signal lines leading from an integrated drive electronics (IDE) controller to the first and second hard disk drives, in response to a bus exchange control signal fed from a system controller to pass or cross switch the integrated drive electronics (IDE) interface signal paths directed to the first and second hard disk drives. The computer system further includes a controller for producing the bus exchange control signal, under control of the system management part by referring to the first and second hard disk drive status information during booting or resuming process.

32 Claims, 9 Drawing Sheets

COMPUTER SYSTEM CAPABLE OF SELECTIVE BOOTING FROM TWO HARD DISK DRIVES

CLAIM OF PRIORITY

This application makes reference to, incorporates the same herein, and claims all benefits accruing under 35 U.S.C. § 119 from an application entitled a Computer System Capable of Selective Booting From Two Hard Disk Drives earlier filed in the Korean Industrial Property Office on the 31st day of July 1998, and there duly assigned Ser. No. 97-36651, a copy of which is annexed hereto.

BACKGROUND OF THE INVENTION

1. Technical Field

The present invention relates to a computer system, and more particularly to a computer system having two fixed disk drives with different operating systems in which selective booting and suspend/resume operation of the power management can be performed through the two fixed disk drives.

2. Related Art

Computer systems are information handling systems that are utilized by many individuals includes a central processing unit (CPU), a volatile memory, a non-volatile memory, a display monitor, a keyboard, a mouse, a floppy diskette drive, a compact disc-read only memory (CD-ROM) drive, a modem, a hard disk storage device, and a printer. Typically, a computer system's main components together.

Computer systems have fixed disk drives or hard disk drives as an auxiliary storage and the hard disk drive usually stores an operating system to operate the computer system during the booting process. A typical personal computer system using an AT-bus and having integrated drive electronics (IDE) type hard disk controller supports two hard disk drives. When the two hard disk stored in the master drive.

Since booting of the personal computer has been performed through one master hard disk drive, it is difficult to use two operating systems in a computer system. For example, if a common operating system such as Microsoft Windows 95 (R) is stored in the master hard disk drive, and the computer user wants to use other operating systems such as OS/2 (R) or Linux (R), the user should run the desired operating system at a different computer system or change the master hard disk drive of a computer system whenever required. Further, in the event that the boot sector of the master hard disk drive failed, it requires change of the bootable hard disk drive or needs a bootable floppy disk for operating the computer system.

Thus, there arises a need to furnish a personal computer system using two integrated drive electronics (IDE) type hard disk drives with a selective booting function which can boot from either the master drive or the slave drive, and thus two operating systems can be used in a single computer system effectively.

Exemplars of recent efforts in the art include U.S. Pat. No. 4,530,052 for Apparatus and Method for a Data Processing Unit Sharing a Plurality of Operating Systems issued to King et al., U.S. Pat. No. 5,452,455 for Asynchronous Command Support for Shared Channels for a Computer Complex Having Multiple Operating Systems issued to Brown et al., U.S. Pat. No. 5,778,171 for Processor Interface Chip for Dual-microprocessor Processor System issued to Rahman et al., U.S. Pat. No. 5,134,580 for Computer with Capability to Automatically Initialize in a First Operating System of Choice and Reinitialize in a Second Operating System of Choice Without Computer Shutdown for Bertram et al., U.S. Pat. No. 5,278,973 for Dual Operating System Computer for O'Brien et al., U.S. Pat. No. 5,471,615 for Distributed Data Processing System Having Front-end and Back-end Computers with Different Operating Systems issued to Amatsu et al, U.S. Pat. No. 5,655,154 for Method and System for Sharing Utilities Between Operating Systems issued to Jain et al., U.S. Pat. No. 5,694,600 for Methods And Apparatus For Booting a Computer Having a Removable Media Disk Drive issued to Khenson et al., U.S. Pat. No. 5,673,403 for Method and System for Displaying Applications of Different Operating Systems on a Single System Using the User Interface of the Different Operating Systems issued to Brown et al., U.S. Pat. No. 4,626,986 for Processor Having Plural Initial Loading Programs for Loading Different Operating Systems issued to Mori, U.S. Pat. No. 5,535,411 for Redundant Computer System Which Boots One System as the Primary Computer Form a Shared Drive issued to Speed et al, U.S. Pat. No. 5,361,358 for System And Method For Installing Program Code For Operation From Multiple Bootable Operating Systems issued to Cox et al., U.S. Pat. No. 5,414,860 for Power Management Initialization for a Computer Operable under a Plurality of Operating Systems issued to Canova, Jr. et al., U.S. Pat. No. 5,524,245 for System for Booting Computer for Operation in Either One of Two Byte-order Modes issued to Zarrin et al., U.S. Pat. No. 5,715,456 for Method And Apparatus For Booting a Computer System Without Pre-installing an Operating System issued to Bennett et al.

Although various computer systems having multiple operating systems currently exist, I have discovered that there is a need to provide an improved computer system capable of selective booting from multiple disk drives.

SUMMARY OF THE INVENTION

It is therefore an object of the invention to provide a computer system which is capable of selective booting from two hard disk drives.

It is another object of the invention to provide a computer system capable of selective booting from two hard disk drives, in which suspend/resume operation of the power management can be performed through the two hard disk drives.

In accordance with the present invention, the computer system comprises a first hard disk drive storing a first operating system and a second hard disk drive storing a second operating system, each of the first and second hard disk drives has a reserved data storage area for the suspend operation. A port exchanger is intervening in the master and slave integrated drive electronics (IDE) interface signal lines led from an integrated drive electronics (IDE) controller to the first and second hard disk drives, in response to a bus exchange control signal fed from a system controller to pass or cross switch the integrated drive electronics (IDE) interface signal paths directed to the first and second hard disk drives. The computer system further includes a controller for producing the bus exchange control signal, under control of the system management part by referring to the first and second hard disk drive status information during booting or resuming process.

Preferably, the second hard disk drive is a removable hard disk drive. In the preferred embodiment of this invention, the port exchanger includes a switching unit having two input ports for connecting with a group of master integrated drive electronics (IDE) interface signal lines and slave integrated drive electronics (IDE) interface signal lines, and having two output ports for connecting with a group of integrated drive electronics (IDE) interface signal lines directed to the first hard disk drive and second hard disk drive, respectively. Also, the switching unit includes a plurality of switching blocks having a pair of input terminals and output terminals, each of which has four N-channel metal oxide semiconductor(NMOS) transistors coupled between and across each input terminal and output terminal, in which the gates of transistors coupled between the input and output terminals are commoned in a row to be connected with the output of a first AND gate, and the gate inputs of transistors coupled across the input and output terminals are commoned in a row to be connected with output of a second AND gate, and wherein the control signal fed from the controller is applied to one input of the first AND gate via an inverter and with one input of the second AND gate, and a bus enable signal is applied to the other input of each AND gate via inverters. The bus enable signal line is grounded so that the other input of the first and second AND gates may always be enabled.

In accordance with the present invention, provided is a method for booting a computer system from the first and second bootable hard disk drives selectively and for performing resume operation of the power management, the method comprises the steps of determining whether the first and second hard disk drives are in normal state or suspend state, by checking each hard disk status information stored in the basic input output system-random access memory (BIOS RAM), in which normal state represents that a hard disk drive has been powered off by normal shut off operation and suspend state represents that a hard disk drive has been powered off by the suspend operation of the power management; performing a boot hard disk drive selection routine if the first and second hard disk drives are in the same normal state; determining whether the first hard disk drives is in normal state and the second hard disk drive is in suspend state; performing a selection routine for booting from the first hard disk drive or resuming from the second hard disk drive if the first hard disk drives is in normal state and the second hard disk drive is in suspend state; determining whether the first hard disk drives is in suspend state and the second hard disk drive is in normal state; and performing a selection routine for resuming from the first hard disk drive or booting from the second hard disk drive if the first hard disk drives is in suspend state and the second hard disk drive is in normal state. Each selection routine is described in a corresponding flowchart and associated discussion therefor.

According to this invention, since boot hard disk drives selection and suspend/resuming operation for two hard disk drives is possible by user interaction in a complementary metal oxide semiconductor (CMOS) setup program or a basic input output system (BIOS) program, dual operating system can be used in a computer system in an easy and efficient way. Further, the present invention provides a remedy for the hard disk failure in the event that the boot sector of the master hard disk drive has failed, if the first and second hard disk drives store the same operating system.

To achieve these and other objects in accordance with the principles of the present invention, as embodied and broadly described, the present invention provides a computer apparatus controlling bootup processes of a computer system, the apparatus comprising: a central processing unit controlling a computer system; a first storage unit storing a first bootable operating system; a second storage unit storing a second bootable operating system; a storage control unit having a first terminal, a second terminal, and a third terminal, said third terminal being coupled to said central processing unit, and said storage control unit controlling said first and second storage units; a switch unit being coupled to said first and second terminals of said storage control unit, and being coupled to said first and second storage units; a system control unit being coupled to said central processing unit and said switch unit, transmitting a switching signal to said switch unit in accordance with said central processing unit during a bootup process of the computer system; when said switching signal corresponds to a first signal, said switch unit connecting said first terminal of said storage control unit with said second storage unit and connecting said second terminal of said storage control unit with said first storage unit; and when said switching signal does not correspond to said first signal, said switch unit connecting said first terminal of said storage control unit with said first storage unit and connecting said second terminal of said storage control unit with said second storage unit.

To achieve these and other objects in accordance with the principles of the present invention, as embodied and broadly described, the present invention provides a method controlling bootup processes of a computer system, the method comprising the steps of: detecting power data stored in a basic input output system-random access memory of a computer system, said power data corresponding to a power mode selected from among a power-off state and a suspend state, said power-off state corresponding to a low level of power consumption and said suspend state corresponding to an intermediate level of power consumption higher than said low level; determining when a first storage unit and a second storage unit are in said power-off state, in accordance with said power data, said first storage unit being coupled to the computer system and storing a first bootable operating system, and said second storage unit being coupled to the computer system and storing a second bootable operating system; executing a first bootup selection routine when said first and second storage units are in said power-off state, said first bootup selection routine corresponding to a routine selected from among a first bootup routine utilizing said first bootable operating system stored on said first storage unit and a second bootup routine utilizing said second bootable operating system stored on said second storage unit, said first and second bootup routines transitioning the computer system from said power-off state to a power-on state, said power-on state corresponding to a high level of power consumption higher than said intermediate level; determining when said first storage unit is in said power-off state and said second storage unit is in said suspend state, in accordance with said power data; executing a second bootup selection routine when said first storage unit is in said power-off state and said second storage unit is in said suspend state, said second bootup selection routine corresponding to a routine selected from among said first bootup routine utilizing said first bootable operating system stored on said first storage unit and a first resume routine utilizing said second bootable operating system stored on said second storage unit, said first resume routine transitioning the computer system from said suspend state to said power-on state; determining when said first storage unit is in said suspend state and said second storage unit is in said power-off state, in accordance with said power data; and executing a third bootup selection routine when said first storage unit is in said suspend state and said second storage unit is in said power-off state, said third bootup selection routine corresponding to a routine selected from among a second resume routine utilizing said first bootable operating system stored on said first storage unit and said second bootup routine utilizing said second bootable operating system stored on said second storage unit, said second resume routine transitioning the computer system from said suspend state to said power-on state.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Figure 1:
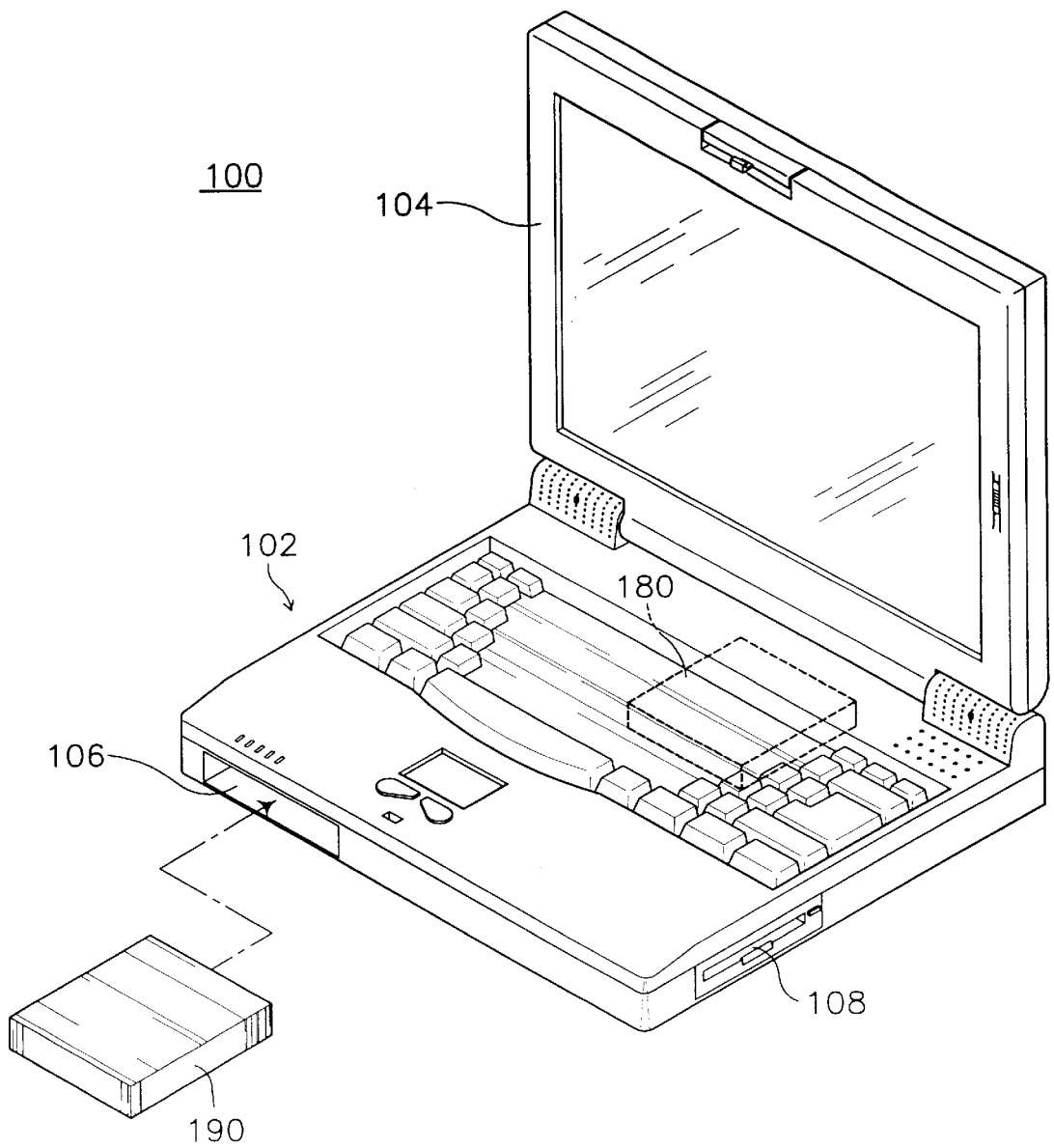
FIG. 1 illustrates a portable computer in which an extra fixed disk drive is used in addition to a fixed disk drive of common operating system.

Turn now to FIG. 1, which illustrates a portable computer in which an extra fixed disk drive is used in addition to a fixed disk drive of common operating system. Referring to FIG. 1, there is shown a portable computer with which the present invention can be implemented. The portable computer 100 has a main body 102 and a flat panel display 104 hingedly mounted at a rear side of the main body 102. Also, a keyboard and touch pad are incorporated at a top portion of the main body 102. The main body 102 includes peripheral devices, for example a floppy disk drive 108 and a hard disk drive 180. Further, a module bay 106 is provided at front side of the main body to receive optional peripheral function modules 190 such as a compact disk-read only memory (CD-ROM) drive or an extra hard disk drive. The function modules 190 can be plugged into the module bay 106. If extra hard disk drive is used as the plug-in module 190, the system recognizes the presence of the secondary hard disk drive and automatically configures the two hard disk drives during the booting process. The internal hard disk drive 180 will be set as the master drive and the extra hard disk drive 190 as the slave drive.

The two hard disk drives, that is, the master drive 180 and the slave drive 190, may be installed having the same operating system or having different operating systems. A selective booting as well as suspend/resume operation of power management can be performed, in accordance with the principles of the present invention. The portable computer of FIG. 1 has a modular type secondary hard disk drive 190 which can be utilized to implement the principles of the present invention. In addition, a desktop computer having two fixed hard disk drives can be utilized to implement the principles of the present invention.

Figure 2:
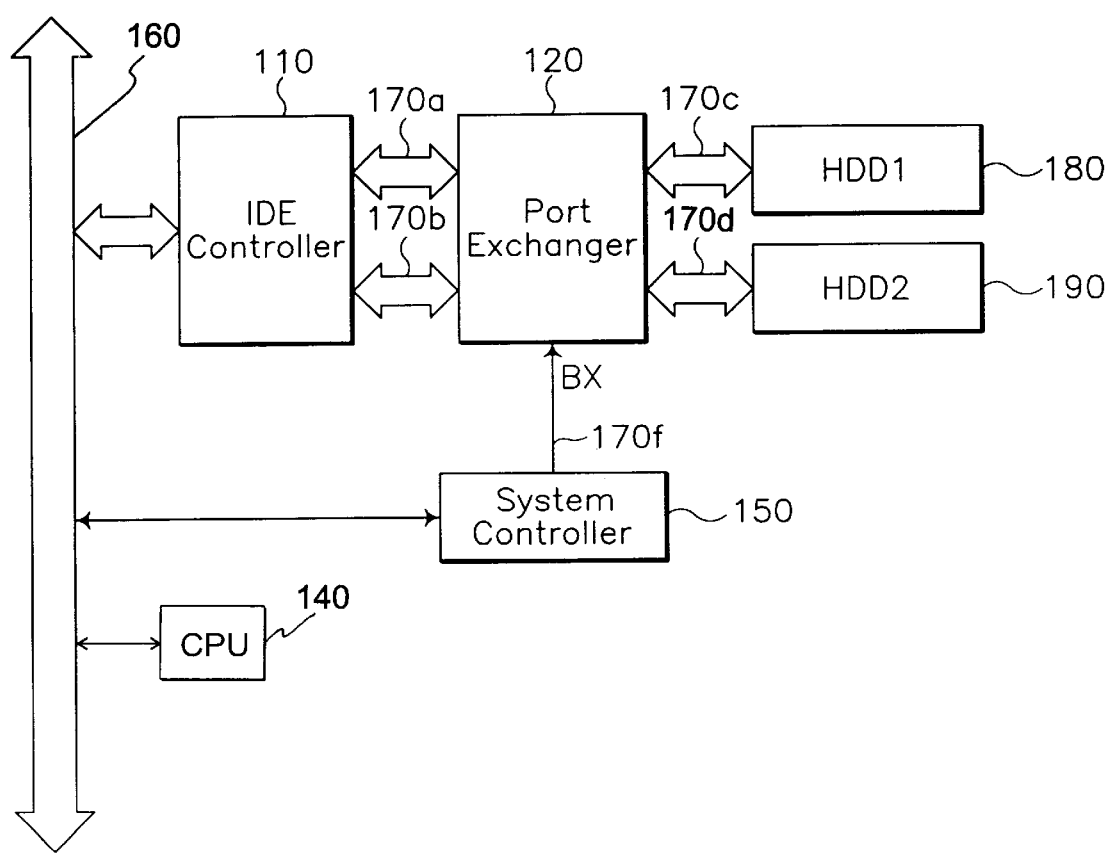
FIG. 2 illustrates a computer system enabling a selective booting function among two hard disk drives, in accordance with the principles of the present invention.

Turn now to FIG. 2, which illustrates a computer system enabling a selective booting function among two hard disk drives, in accordance with the principles of the present invention. FIG. 2 shows a main part of a computer system which enables a selective booting function between two hard disk drives in accordance with the present invention. The computer system includes an integrated drive electronics (IDE) controller 110, a port exchanger 120, a system controller 150, a first hard disk drive (HDD1) 180, and a second hard disk drive (HDD2) 190. The integrated drive electronics (IDE) controller 110 is coupled to a system bus 160. A central processing unit (CPU) 140 is coupled to the system bus 160.

The master integrated drive electronics (IDE) interface signal lines are designated as 170a and serve to couple the integrated drive electronics (IDE) controller 110 with the port exchanger 120. The slave integrated drive electronics (IDE) interface signal lines are designated as 170b and serve to couple the integrated drive electronics (IDE) controller 110 with the port exchanger 120.

The port exchanger 120 is disposed between the integrated drive electronics (IDE) controller 110 and the first and second hard disk drives 180 and 190. The system controller 150 is also connected with the system bus 160 and is provided to supply a control signal BX to the port exchanger 120 via signal line 170f, under control of the central processing unit (CPU) 140.

The port exchanger 120 changes the integrated drive electronics (IDE) interface path directed to the first and second hard disk drives 180 and 190 in response to the control signal BX fed from the system controller 150. In this embodiment, the first hard disk drive 180 stores a first type of operating system and the second hard disk drives 190 stores a second type of operating system different from the first type of operating system.

Figure 3:
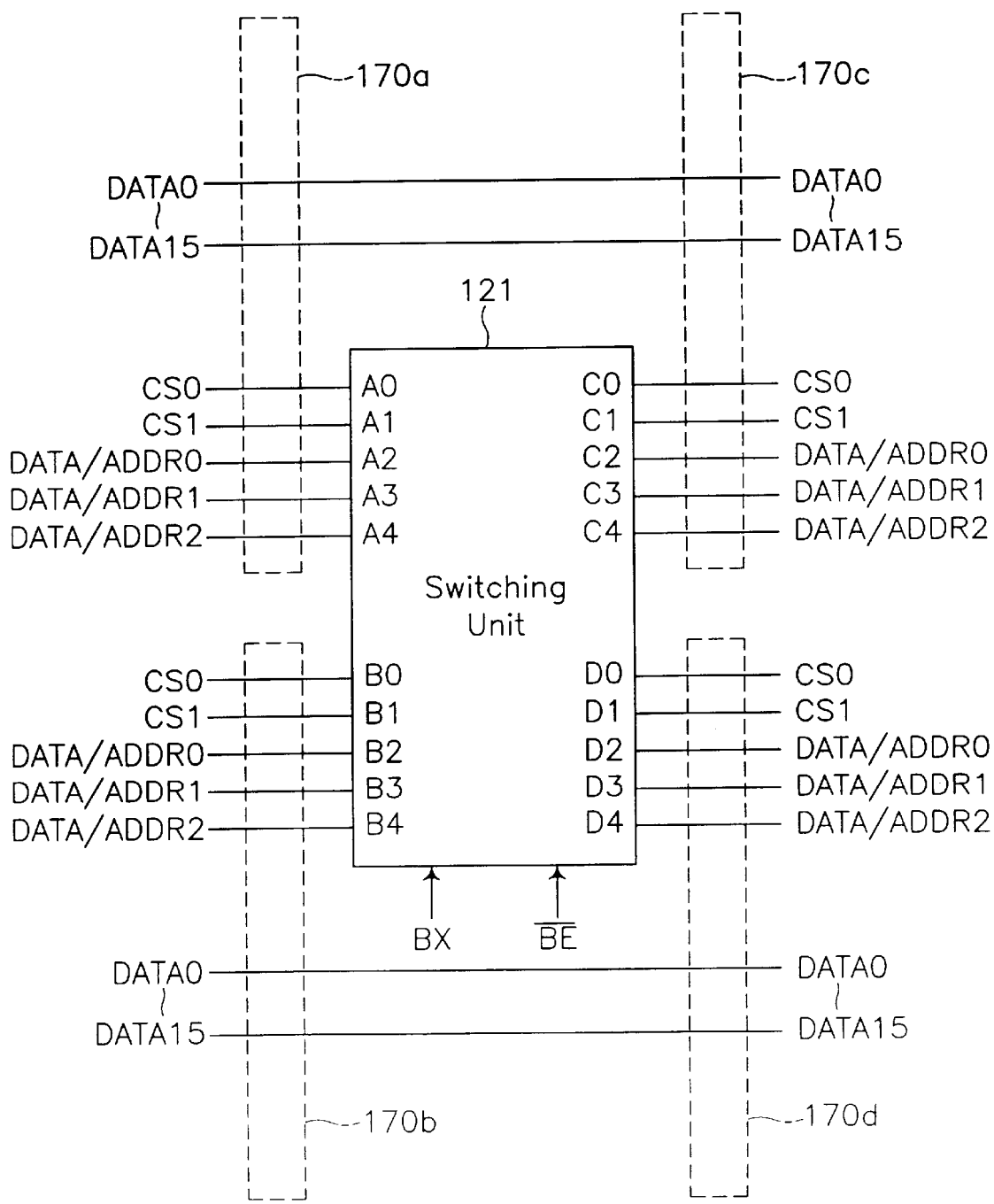
FIG. 3 illustrates the port exchanger shown in FIG. 2, in accordance with the principles of the present invention.

Turn now to FIG. 3, which illustrates the port exchanger shown in FIG. 2, in accordance with the principles of the present invention. A detailed configuration of the port exchanger 120 is shown in FIG. 3. The port exchanger 120 includes a switching unit 121 having two input ports. The first of the two input ports of switching unit 121 is coupled with a group of master integrated drive electronics (IDE) interface signal lines 170a. The second of the two input ports of switching unit 121 is coupled with a group of slave integrated drive electronics (IDE) interface signal lines 170b. Also, the switching unit 121 has two output ports. The first of the two output ports of switching unit 121 is coupled with a group of integrated drive electronics (IDE) interface signal lines 170c directed to the first hard disk drive (HDD1) 180. The second of the two output ports of switching unit 121 is coupled with a group of integrated drive electronics (IDE) interface signal lines 170d directed to the second hard disk drive (HDD2) 190.

In the switching unit 121 depicted in FIG. 3, each input port has five input terminals and each output port has five output terminals. The first input port has the five input terminals A0, A1, A2, A3, and A4. Two chip select signals CS0 and CS1 are connected to the master integrated drive electronics (IDE) interface signal lines 170a. In addition, three data/address signals DATA/ADDR0, DATA/ADDR 1, and DATA/ADDR2 are connected to the master integrated drive electronics (IDE) interface signal lines 170a.

In FIG. 3, the second input port has the five input terminals B0, B1, B2, B3, and B4. Two chip select signals CS0 and CS1 are connected to the slave integrated drive electronics (IDE) interface signal lines 170b. In addition, three data/address signals DATA/ADDR0, DATA/ADDR1, and DATA/ADDR2 are connected to the slave integrated drive electronics (IDE) interface signal lines 170b. Similarly, the first output port has five terminals C0–C4 and the second output port has five terminals D0–D4. The first output port is coupled with a group of integrated drive electronics (IDE) interface signal lines 170c. The second output port is coupled with a group of integrated drive electronics (IDE) interface signal lines 170d.

Two chip select signals CS0 and CS1 and three data/address signals DATA/ADDR0–DATA/ADDR2 are coupled with the five terminals C0–C4 of the first output port. Two chip select signals CS0 and CS1 and three data/address signals DATA/ADDR0–DATA/ADDR2 are coupled with the five terminals D0–D4 of the second output port.

In FIG. 3, data lines DATA0–DATA15 of integrated drive electronics (IDE) interface signal lines 170a are directly connected with the first hard disk drive 180. Data lines DATA0–DATA15 of integrated drive electronics (IDE) interface signal lines 170b are directly connected with the second hard disk drive 190.

A control input port is provided in the switching unit 121 and connected thereto are bus exchange signal line BX and bus enable signal line BE. The bus exchange signal line BX and the bus enable signal line BE electrically connect the system controller 150 of FIG. 2 with the switching unit 121 of FIG. 3. Further, although not shown in the drawing, an integrated drive electronics (IDE) status signal line (IDE ACTIVE), a 16-bit data input/output select line (IOCS16), a write enable signal line (WE#), a read enable signal line (RD#), and an interrupt signal line (INTRPT) are directly connected with the first and second hard disk drives.

Figure 4:
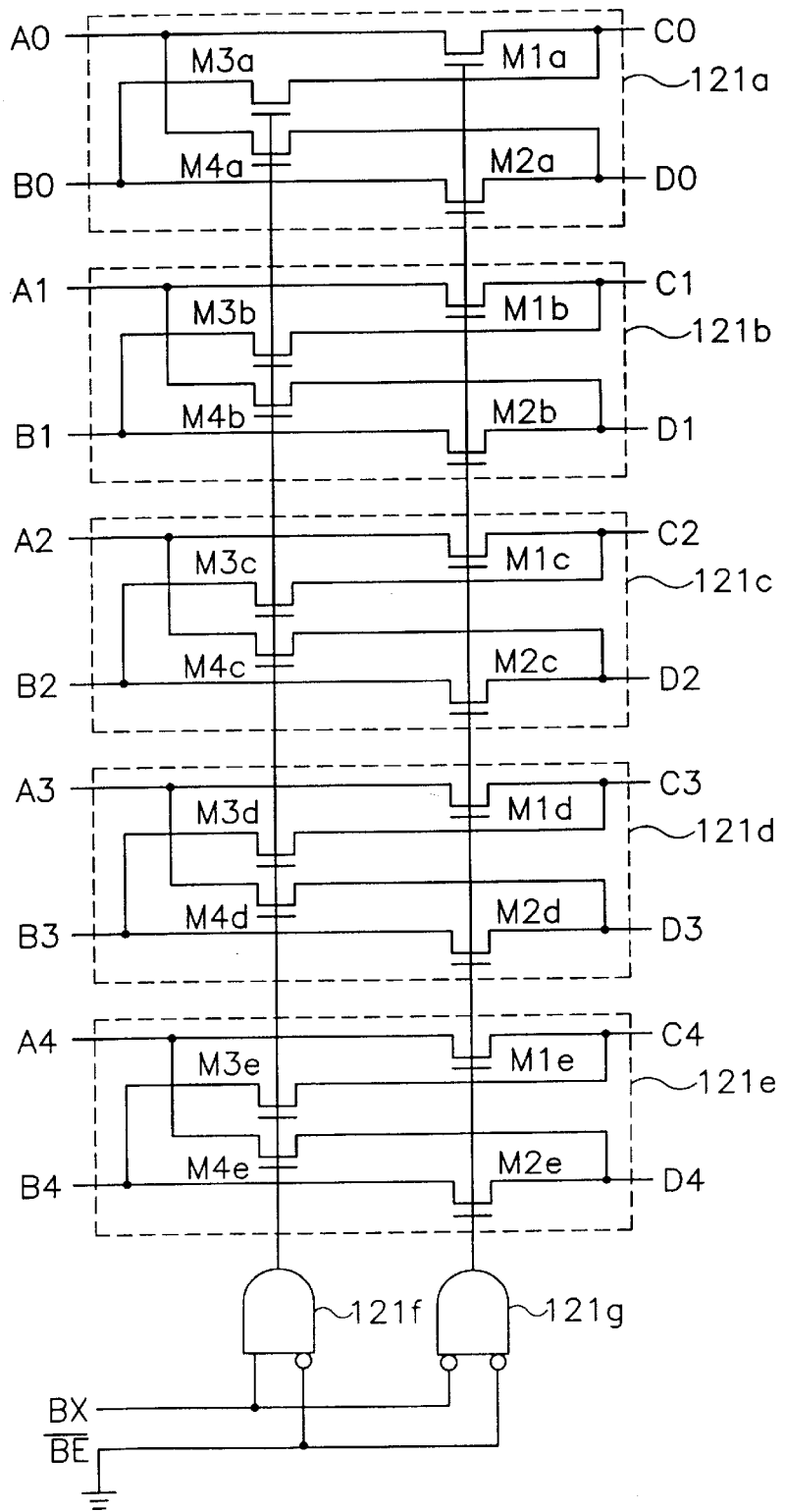
FIG. 4 illustrates the switching unit shown in the port exchanger of FIG. 3, in accordance with the principles of the present invention.

Turn now to FIG. 4, which illustrates the switching unit shown in the port exchanger of FIG. 3, in accordance with the principles of the present invention. FIG. 4 shows a schematic diagram of the switching unit 121 used in the port exchanger 120. The switching unit 121 includes five switching blocks 121a, 121b, 121c, 121d, and 121e, each having two input terminals and two output terminals. Each one of the five switching blocks 121a–121e has four N-channel metal oxide semiconductor (NMOS) transistors M1, M2, M3, and M4 coupled between and across each input terminal and output terminal.

Refer now to FIGS. 3 and 4, which illustrate components of switching unit 121. Switching block 121a includes a first input terminal A0, a second input terminal B0, a first output terminal C0, and a second output terminal D0. The switching block 121a includes a first N-channel metal oxide semiconductor (NMOS) transistor M1a which couples the first input terminal A0 with the first output terminal C0. The switching block 121a includes a second N-channel metal oxide semiconductor (NMOS) transistor M2a which couples the second input terminal B0 with the second output terminal D0. The switching block 121a includes a third N-channel metal oxide semiconductor (NMOS) transistor M3a which couples the second input terminal B0 with the first output terminal C0. Also, the switching block 121a includes a fourth N-channel metal oxide semiconductor (NMOS) transistor M4a which couples the first input terminal A0 with the second output terminal D0.

In FIG. 4, two input terminals of each switching block correspond to input ports A0–A4 and B0–B4 of the master and slave integrated drive electronics (IDE) interface signal lines 170a and 170b, and two ouput terminals of each switching block correspond to output ports C0–C4 and D0–D4. The gate inputs of transistors M1 and M2 coupled between the input and output terminals of the switching blocks 121a–121e are commoned in a row to be connected with the output of a first AND gate 121g. Thus, all of the transistors M1 and M2 comprise a first group of transistors. The gate inputs of transistors M3 and M4 coupled between the input and output terminals of the switching blocks 121a–121e are commoned in a row to be connected with the output of a second AND gate 121f. Thus, all of the transistors M3 and M4 comprise a second group of transistors. The AND gate 121g has two inputs and one output. The AND gate 121f has two inputs and one output.

In FIG. 4, the bus exchange signal line BX is connected with a first input of the AND gate 121g via an inverter and with a first input of the AND gate 121f. The bus enable signal line BE is connected with a second input of the AND gate 121g via an inverter and with a second input of the AND gate 121f via an inverter. Preferably, the bus enable signal line BE is grounded so that the second input of AND gate 121g and the second input of AND gate 121f may always be enabled. Hereinafter, this description of the preferred embodiment shall presume that the bus enable line BE is grounded and always corresponds to a low level. The first transistor group of M1 and M2 and the second transistor group of M3 and M4 in each of the switching blocks 121a–121e are turned on or off in response to output levels of the AND gates 121g and 121f.

A direct connection exists as follows. When the bus exchange signal line BX is at a low level, the output of the AND gate 121g becomes a high level and the output of the AND gate 121f becomes a low level. Thus, the transistors M1 and M2 of each switching blocks 121a–121e are turned on and the transistors M3 and M4 are turned off. Therefor, signal paths between two input ports A0–A4, B0–B4 and the corresponding output ports C0–C4, D0–D4 can be linearly connected and thus the master integrated drive electronics (IDE) interface signal lines 170a are coupled to the first hard disk drive 180 and the slave integrated drive electronics (IDE) interface signal lines 170b to the second hard disk drive 190. The linear connection is a direct connection. In other words, input port A0 will be electrically connected with output port C0 thus coupling master IDE interface signal lines 170a with the first hard disk drive 180. And input port B0 will be electrically connected with output port D0 thus coupling slave IDE interface signal lines 170b with the second hard disk drive 190.

Alternatively, an indirect connection exists as follows. When the bus exchange signal line BX is at high level, the output of the AND gate 121g becomes low and the output of the AND gate 121f becomes high. Thus, the transistors M1 and M2 of each switching blocks 121a–121e are turned off and the transistors M3 and M4 are turned on. With this operation, signal paths between the input ports A0–A4 and B0–B4 and the output ports C0–C4 and D0–D4 are cross switched and thus the master integrated drive electronics (IDE) interface signal lines 170a are coupled to the second hard disk drive 190 and the slave integrated drive electronics (IDE) interface signal lines 170b to the first hard disk drive 180. The cross switching is an indirect connection. In other words, input port A0 will be electrically connected with output port D0 thus coupling master IDE interface signal lines 170a with the second hard disk drive 190. And input port B0 will be electrically connected with output port C0 thus coupling slave IDE interface signal lines 170b with the first hard disk drive 180.

The system controller 150 controls the level of the bus exchange signal line BX in accordance with information provided by the system management part, for example a complementary metal oxide semiconductor-random access memory (CMOS RAM). The basic input output system (BIOS) setup program may include a "SWAP BOOT HARD DISK DRIVE" feature which can allow users to select the slave hard disk drive as the boot hard disk drive. In this case, the slave hard disk drive should be installed with an operating system in advance.

Also, the level control of the bus exchange signal BX can be performed through a system's basic input output system (BIOS) program during the booting or resuming operation of the computer system. The resuming operation is carried out when the system comes out of the suspend mode. Conventionally, the suspend/resume operation is supported by the power management system, also known as Advanced Power Management (APM). A common operating system such as Microsoft Windows 95 (R) supports Advanced Power Management (APM) version 1.1.

Power management is concerned with the state of the system power usage. Suspend mode is when the system is not working for a preset time interval, the central processing unit (CPU) clock is stopped, and most power managed devices are not powered. When the system is switched to the suspend mode, a basic input output system (BIOS) program performs saving of the current memory and system information to a hard disk drive before the system goes to power-off status. When the system comes out of the suspend mode, it is retrieved from the hard disk drive to resume normal operations. The power management is most useful for portable computers to use less power while the system is running on battery power. The present invention also provides a basic input output system (BIOS) program which can perform selective booting and resuming operation relative to the first and second bootable hard disk drives. A power-off state corresponds to a low level of power consumption, a suspend state corresponds to an intermediate level of power consumption higher than said low level, and a power-on state corresponds to a high level of power consumption higher than said intermediate level.

Figure 5:
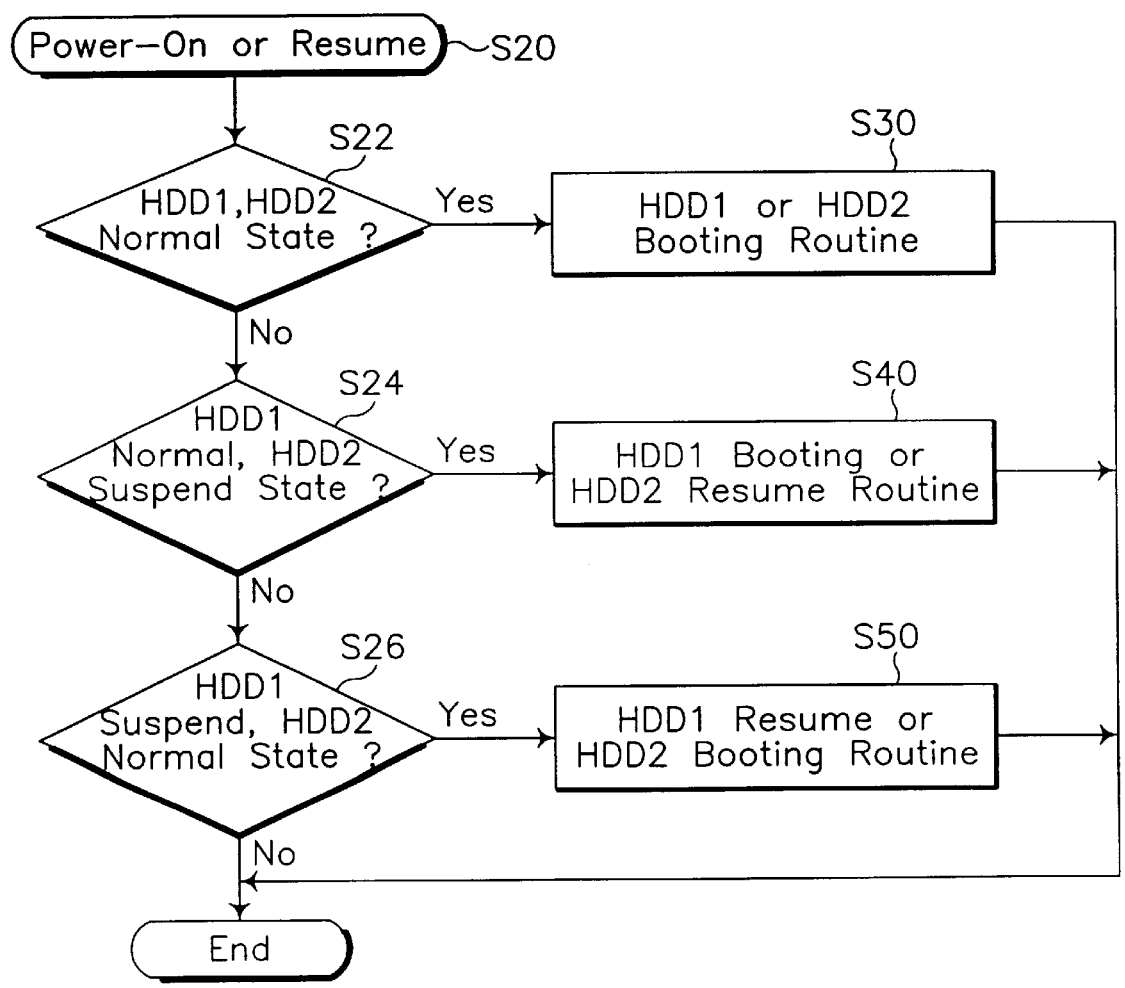
FIG. 5 is a flowchart depicting selective booting and resuming operation for the first and second hard disk drives, in accordance with the principles of the present invention.

Turn now to FIG. 5, which is a flowchart depicting selective booting and resuming operation for the first and second hard disk drives, in accordance with the principles of the present invention. FIG. 5 shows the booting and resuming operation performed by the basic input output system (BIOS) program in accordance with the present invention. At step S20, the computer is started with the power switch on. At step S22, a determination is made whether the first hard disk drive 180 and the second hard disk drive 190 are in normal state, by checking hard disk status information stored in the basic input output system-random access memory (BIOS RAM). Hard disk status information may include a register value depending on the state as to whether a hard disk drive has been powered off by normal shut off operation or by the suspend operation of the power management.

At step S30 of FIG. 5, when the first and second hard disk drives 180 and 190 are in the normal state, a booting hard disk drive selection routine is performed. The booting hard disk drive selection routine of step S30 will be described in detail below with reference to FIG. 6. However, at step S24 following step S22, when the first and second hard disk state values are not accord with the query of step S22, further determination is made as to whether the first hard disk drive 180 is in normal state and the second hard disk drive 190 is in suspend state. At step S40, when the first hard disk drive 180 is in normal state and the second hard disk drive 190 is in suspend state, a selection routine for booting from the first hard disk drive 180 or resuming from the second hard disk drive 190 is performed. The booting/resuming routine of step S40 will be described in detail below with reference to FIG. 7.

At step S26, when the first and second hard disk state values are not accord with the query of step S24, still further determination is made as to whether the first hard disk drive 180 is in suspend state and the second hard disk drive 190 is in normal state. At step S50, when the first hard disk drive 180 is in suspend state and the second hard disk drive 190 is in normal state, a selection routine for resuming from the first hard disk drive 180 or booting from the second hard disk drive 190 is performed. The booting/resuming routine of step S50 will be described in detail below with reference to FIG. 8. After step S26, when the first and second hard disk state values are not accord with the query of step S26, the control flow returns to the main routine of the basic input output system (BIOS) program.

Figure 6:
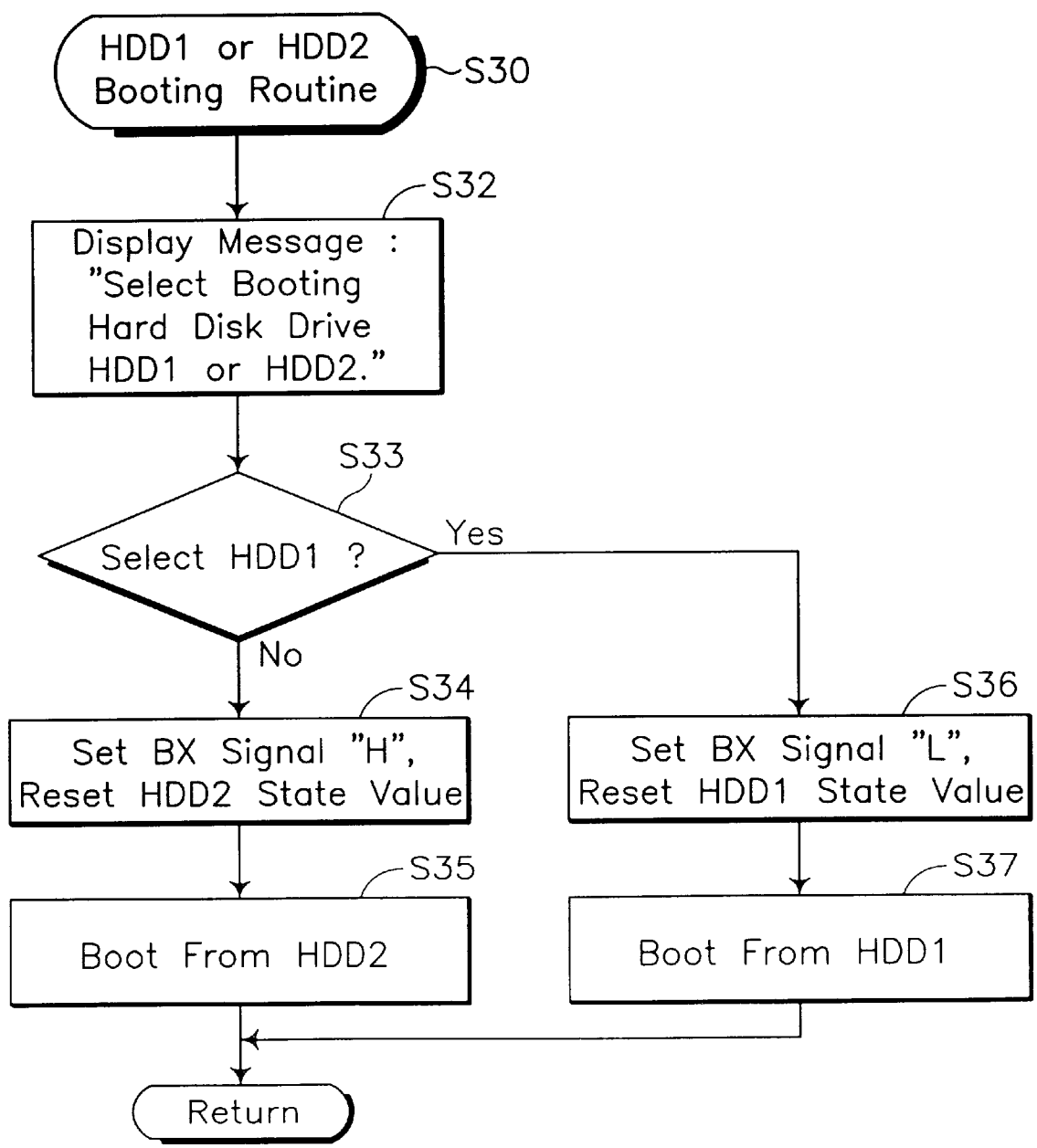
FIG. 6 is a flowchart depicting the boot selection routine relative to the first and second hard disk drives indicated in step S30 of FIG. 5, in accordance with the principles of the present invention.

Turn now to FIG. 6, which is a flowchart depicting the boot selection routine relative to the first and second hard disk drives indicated in step S30 of FIG. 5, in accordance with the principles of the present invention. FIG. 6 shows the booting hard disk drive selection routine indicated in FIG. 5. At step S30, the booting hard disk drive selection routine begins. At step S32, a message is displayed indicating "Select Booting Hard Disk Drive, the first hard disk (C) or the second hard disk (D)?" At step S33, a determination is made as to whether the first hard disk drive is selected. At step S36, when the first hard disk drive is selected, a low level bus exchange signal BX is produced and the state value of the first hard disk drive is reset. At step S37 following step S36, booting from the first hard disk drive operation is performed. However, at step S34 following step S33, when the first hard disk drive is not selected in step S33, a high level bus exchange signal BX is produced and the state value of the second hard disk drive is reset. At step S35 following step S34, booting from the second hard disk drive operation is performed.

Figure 7:
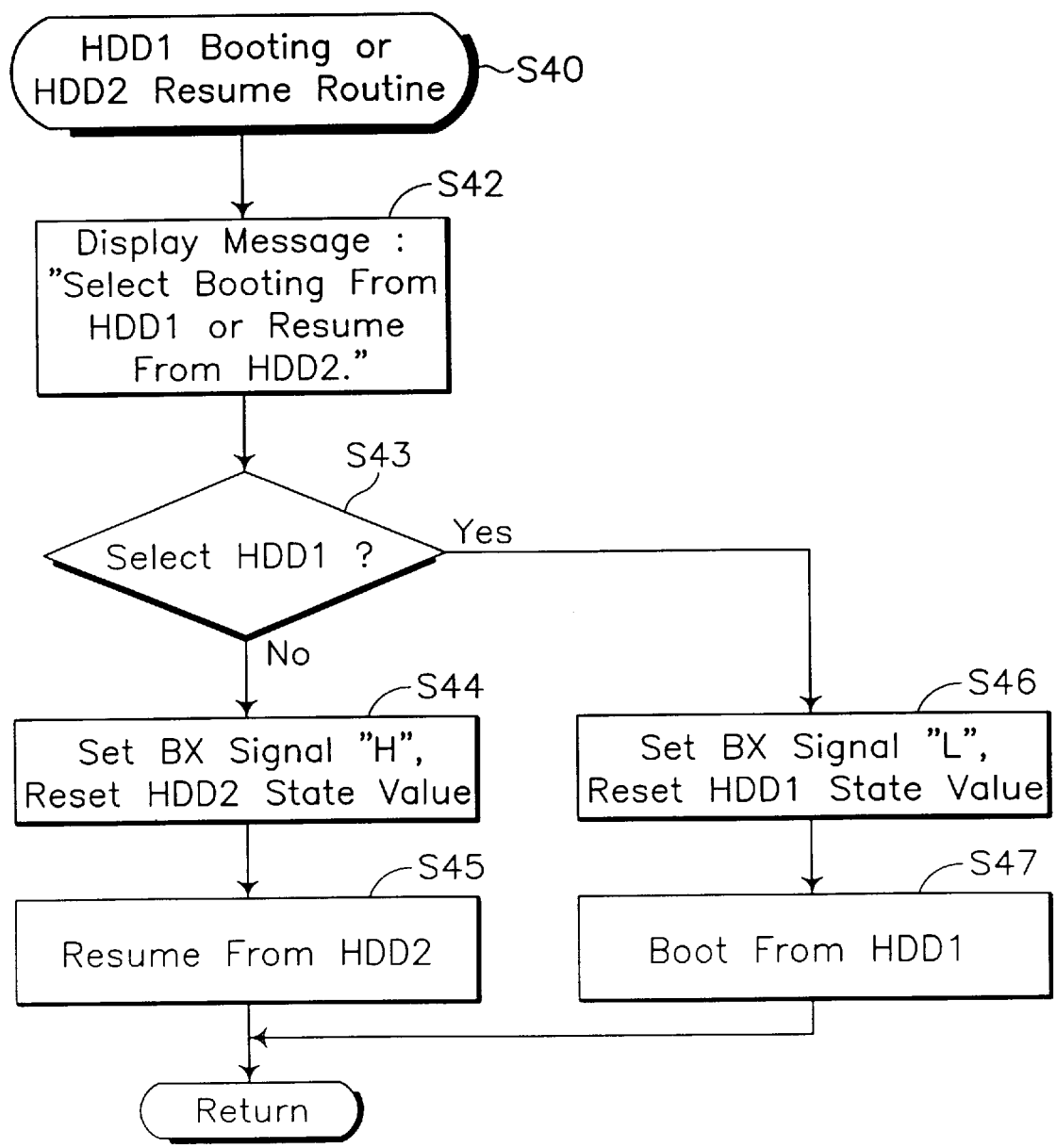
FIG. 7 is a flowchart depicting the first hard disk booting or the second hard disk resuming selection routine indicated in step S40 of FIG. 5, in accordance with the principles of the present invention.

Turn now to FIG. 7, which is a flowchart depicting the first hard disk booting or the second hard disk resuming selection routine indicated in step S40 of FIG. 5, in accordance with the principles of the present invention. FIG. 7 shows the first hard disk booting or the second hard disk resuming selection routine indicated in FIG. 5. At step S40, the booting/resume routine begins. At step S42, a message is displayed indicating "Select Booting from the First Hard Disk (C) or Resuming from the Second Hard Disk (D)." At step S43, a determination is made as to whether the first hard disk drive is selected to perform boot operation. At step S46, when the first hard disk drive is selected, a low level bus exchange signal BX is produced and the state value of the first hard disk drive is reset. At step S47 following step S46, booting from the first hard disk drive operation is performed. However, at step S44 following step S43, when resuming from the second hard disk drive is selected in step S43, a high level bus exchange signal BX is produced and the state value of the second hard disk drive is reset to zero (0). At step S45 following step S44, resuming from the second hard disk drive operation is performed.

Figure 8:
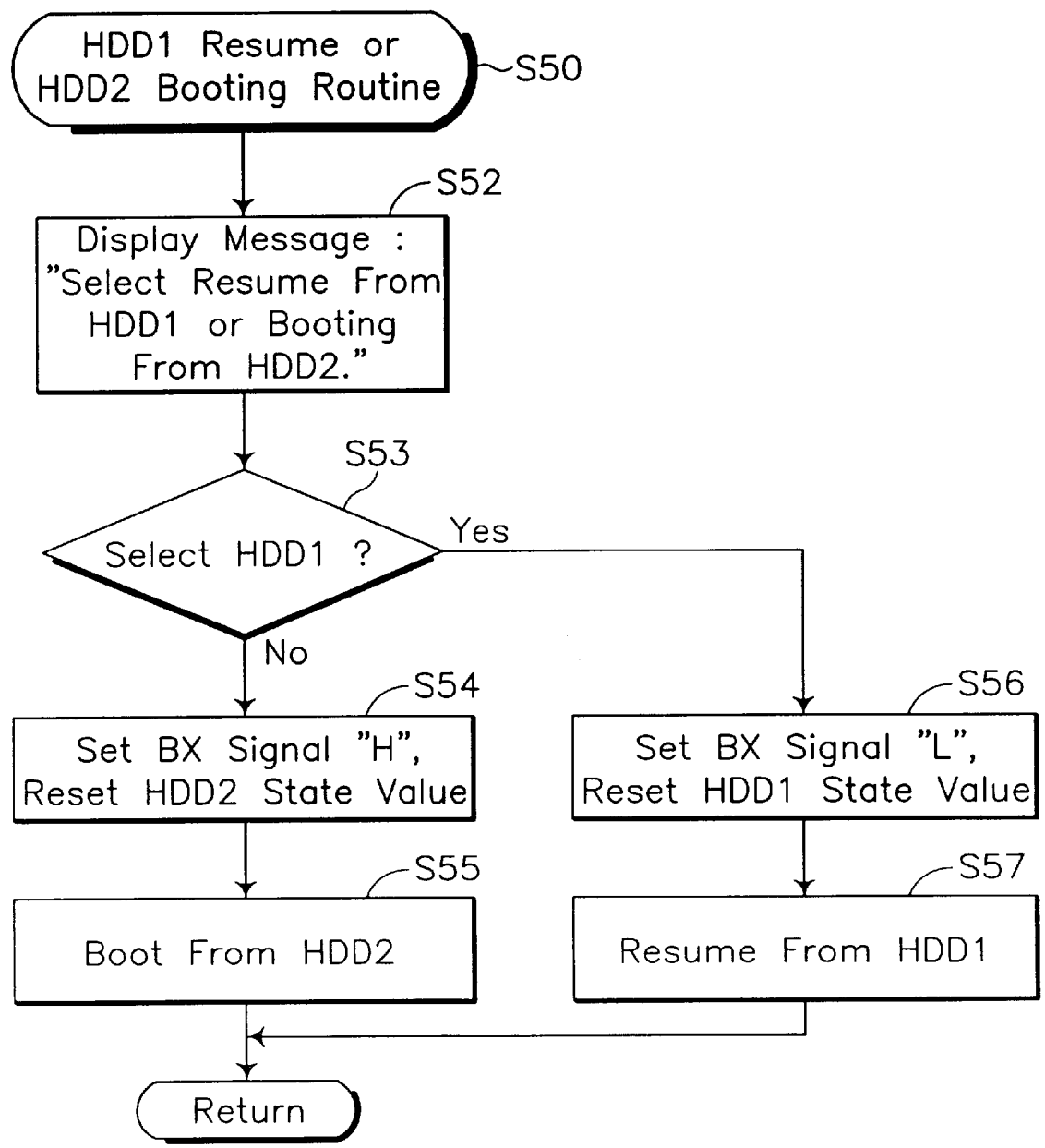
FIG. 8 is a flowchart depicting the first hard disk resuming or the second hard disk booting selection routine indicated in step S50 of FIG. 5, in accordance with the principles of the present invention.

Turn now to FIG. 8, which is a flowchart depicting the first hard disk resuming or the second hard disk booting selection routine indicated in step S50 of FIG. 5, in accordance with the principles of the present invention. FIG. 8 shows resuming from the first hard disk or booting from the second hard disk selection routine indicated in FIG. 5. At step S50, the booting/resume routine begins. At step S52, a message is displayed indicating "Select Booting from the Second Hard Disk (D) or Resuming from the First Hard Disk (C)." At step S53, a determination is made as to whether the first hard disk drive is selected to perform resuming operation. At step S56, when the first hard disk drive is selected, a low level bus exchange signal BX is produced and the state value of the first hard disk drive is reset to zero. At step S57 following step S56, resuming from the first hard disk drive operation is performed. However, at step S54 following step S53, when booting from the second hard disk drive is selected in step S53, a high level bus exchange signal BX is produced and the state value of the second hard disk drive is reset to zero (0). At step S55 following step S54, booting from the second hard disk drive operation is performed.

Figure 9:
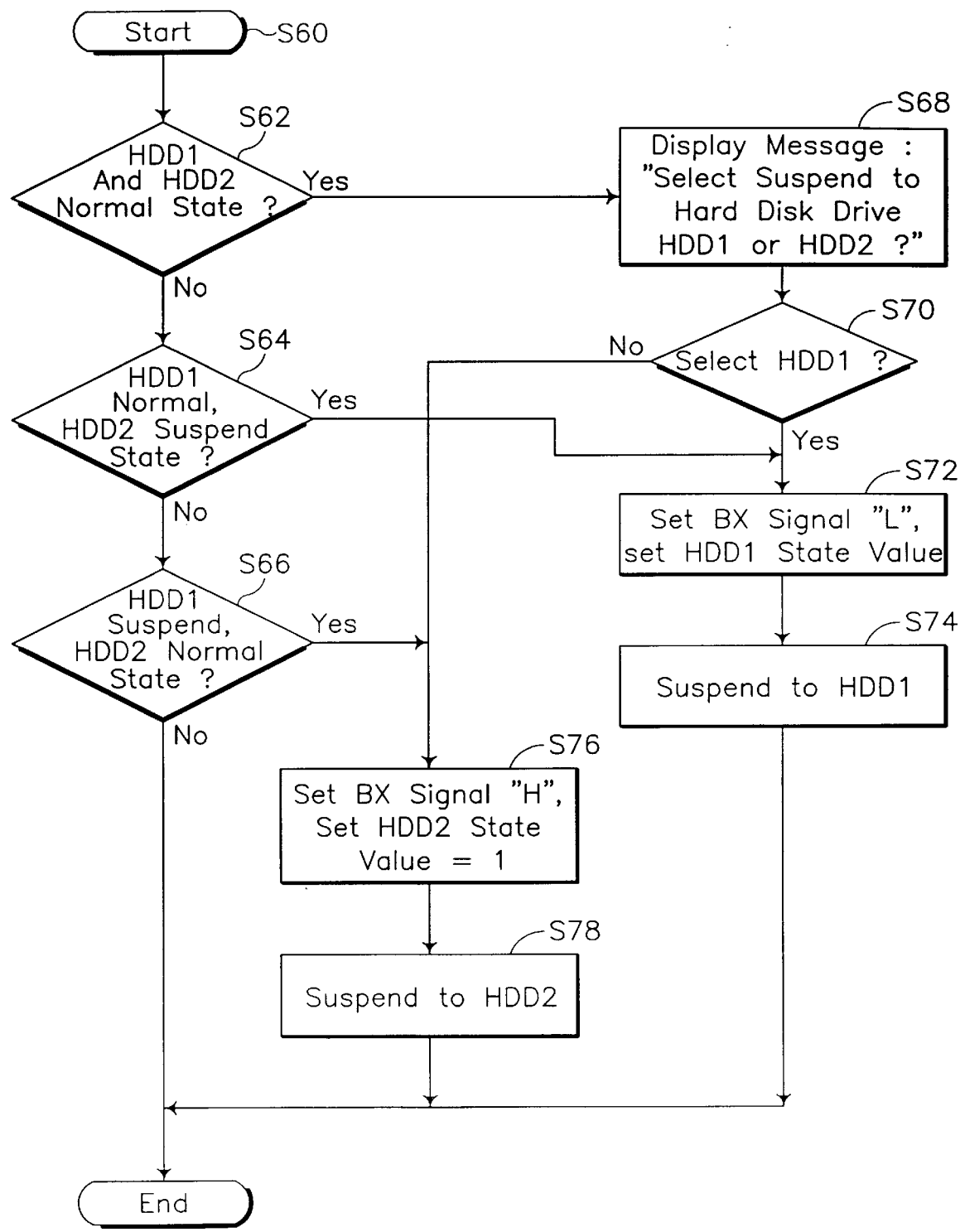
FIG. 9 is a flowchart depicting the suspend to disk operation of the power management relative to two hard disk drives, in accordance with the principles of the present invention.

Turn now to FIG. 9, which is a flowchart depicting the suspend to disk operation of the power management relative to two hard disk drives, in accordance with the principles of the present invention. Referring to FIG. 9, there is shown a suspend-to-disk operation relative to the first and second hard disk drives in accordance with the present invention. At step S60, the power management system allows the system's basic input output system (BIOS) to enter the suspend-to-disk operation. At step S62, a determination is made as to whether the first and second hard disk drives 180 and 190 are in normal state by checking hard disk state value stored in the basic input output system-random access memory (BIOS RAM). At step S68, when the first and second hard disk drives are in the normal state, a message is displayed indicating "Select Suspend to the First Hard Disk Drive (C) or the second hard disk (D)?" At step S70, a determination is made as to whether the first hard disk drive is selected.

At step S72 of FIG. 9, when the first hard disk drive is selected, a low level bus exchange signal BX is produced and the state value of the first hard disk drive is set to "1." At step S74 following step S72, suspend to the first hard disk drive operation is performed. However, at step S76 following step S70, when the first hard disk drive is not selected, a high level bus exchange signal BX is produced and the state value of the second hard disk drive is set to "1." At step S78 following step S76, suspend to the second hard disk drive operation is performed.

However, at step S64, when the first and second hard disk state values are not accord with the query of step S62, further determination is made as to whether the first hard disk drive 180 is in normal state and the second hard disk drive 190 is in suspend state. Step S72 is performed when the hard disk state value is in accord with the query of step S64, and thus a low level bus exchange signal BX is produced and the state value of the first hard disk drive is set to "1." At step S74 following step S72, suspend to the first hard disk drive operation is performed.

However, at step S66, when the first and second hard disk state values are not accord with the query of step S64, still further determination is made as to whether the first hard disk drive 180 is in suspend state and the second hard disk drive 190 is in normal state. Step S76 is performed when each hard disk state value is in accord with the query of step S66, and a high level bus exchange signal BX is produced and the state value of the second hard disk drive is set to "1." At step S78 following step S76, suspend to the second hard disk drive operation is performed.

As apparent from the foregoing description, this invention provides a dual bootable computer in which selective booting as well as suspend/resuming operation can be performed with respect to both first and second hard disk drives. Also, since boot hard disk drives selection and suspend/resuming operation for two hard disk drives is possible by user interaction in a complementary metal oxide semiconductor (CMOS) setup program or a basic input output system (BIOS) program, dual operating system can be used in a computer system in an easy and efficient way.

Further, the present invention provides a remedy for the hard disk failure in the event that the boot sector of the master hard disk drive have failed, if the first and second hard disk drives store the same operating system. The computer system can operated by simply changing the boot hard disk drive from C to D through complementary metal oxide semiconductor (CMOS) setup program and restarting the computer.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A computer apparatus controlling bootup processes of a computer system, the apparatus comprising:

a central processing unit controlling a computer system;

a first storage unit storing a first bootable operating system;

a second storage unit storing a second bootable operating system;

a storage control unit having a first terminal, a second terminal, and a third terminal, said third terminal being coupled to said central processing unit, and said storage control unit controlling said first and second storage units;

a switch unit being coupled to said first and second terminals of said storage control unit, and being coupled to said first and second storage units;

a system control unit being coupled to said central processing unit and said switch unit, transmitting a switching signal to said switch unit in accordance with said central processing unit during a bootup of the computer system;

when said switching signal corresponds to a first signal, said switch unit connecting said first terminal of said storage control unit with said second storage unit and connecting said second terminal of said storage control unit with said first storage unit; and when said switching signal does not correspond to said first signal, said switch unit connecting said first terminal of said storage control unit with said first storage unit and connecting said second terminal of said storage control unit with said second storage unit.

2. The apparatus of claim 1, wherein said first storage unit corresponds to a first fixed media bootable hard disk drive.

3. The apparatus of claim 1, wherein said second storage unit corresponds to a second fixed media bootable hard disk drive.

4. The apparatus of claim 1, wherein said second storage unit corresponds to a removable media bootable hard disk drive.

5. The apparatus of claim 1, wherein said first bootable operating system corresponds to said second bootable operating system.

6. The apparatus of claim 1, wherein said first bootable operating system does not correspond to said second bootable operating system.

7. The apparatus of claim 1, wherein said storage control unit corresponds to a hard disk controller unit.

8. The apparatus of claim 1, wherein said storage control unit corresponds to a integrated drive electronics controller.

9. The apparatus of claim 8, further comprising:

a first plurality of cables coupling said first terminal of said integrated drive electronics controller with a first input terminal of said switch unit;

a second plurality of cables coupling said second terminal of said integrated drive electronics controller with a second input terminal of said switch unit;

a third plurality of cables coupling said first storage unit with a first output terminal of said switch unit; and a fourth plurality of cables coupling said second storage unit with a second output terminal of said switch unit.

10. The apparatus of claim 1, further comprising:

a first AND logic gate having a first input port, a second input port, and an output port, said first input port of said first AND gate receiving said switching signal from said system control unit, and said output port of said first AND gate conveying to said switch unit a first connection signal in accordance with said switching signal;

a second AND logic gate having a first input port, a second input port, and an output port, said output port of said second AND gate conveying to said switch unit a second connection signal in accordance with said switching signal, said second connection signal being not identical to said first connection signal;

a first inverter having a first terminal and a second terminal, said first terminal of said first inverter being receiving an enable signal, and said second terminal of said first inverter being coupled to said second input port of said first AND gate;

a second inverter having a first terminal and a second terminal, said first terminal of said second inverter receiving said switching signal from said system control unit, and said second terminal of said second inverter being coupled to said first input port of said second AND gate; and a third inverter having a first terminal and a second terminal, said first terminal of said third inverter receiving said enable signal, and said second terminal of said third inverter being coupled to said second input port of said second AND gate.

11. The apparatus of claim 10, wherein said enable signal corresponds to a local reference potential causing said second input port of said first and second AND gates to be always enabled.

12. The apparatus of claim 10, wherein said switch unit further comprises:

a plurality of switching blocks, a first switching block selected from among said plurality of switching blocks having a first input terminal, a second input terminal, a first output terminal, and a second output terminal;

said first switching block having a first transistor coupling said first input terminal and said first output terminal, a second transistor coupling said second input terminal and said second output terminal, a third transistor coupling said second input terminal and said first output terminal, and a fourth transistor coupling said first input terminal and said second output terminal;

said first transistor having a control electrode connected to said output port of said second AND logic gate, a first electrode of a principal electrically conducting channel connected to said first input terminal, and a second electrode of a principal electrically conducting channel connected to said first output terminal;

said second transistor having a control electrode connected to said output port of said second AND logic gate, a first electrode of a principal electrically conducting channel connected to said second input terminal, and a second electrode of a principal electrically conducting channel connected to said second output terminal;

said third transistor having a control electrode connected to said output port of said first AND logic gate, a first electrode of a principal electrically conducting channel connected to said second input terminal, and a second electrode of a principal electrically conducting channel connected to said first output terminal; and said fourth transistor having a control electrode connected to said output port of said first AND logic gate, a first electrode of a principal electrically conducting channel connected to said first input terminal, and a second electrode of a principal electrically conducting channel connected to said second output terminal.

13. The apparatus of claim 12, wherein said first transistor corresponds to an N-channel metal oxide semiconductor transistor.

14. The apparatus of clam 1, wherein the computer system has a plurality of power states including a power-off state, a suspend state, and a power-on state, said power-off state corresponding to a low level of power consumption, said suspend state corresponding to an intermediate level of power consumption higher than said low level, and said power-on state corresponding to a high level of power consumption higher than said intermediate level.

15. The apparatus of claim 14, wherein the computer system is in a bootup mode when transitioning from said power-off state to said power-on state.

16. The apparatus of claim 15, wherein the computer system is in a resume mode when transitioning from said suspend state to said power-on state, said resume mode requiring less time than said bootup mode.

17. The apparatus of claim 16, wherein said first storage unit includes a storage area storing data utilized by the computer system when transitioning from said suspend state to said power-on state.

18. The apparatus of claim 16, wherein said second storage unit includes a storage area storing data utilized by the computer system when transitioning from said suspend state to said power-on state.

19. A computer apparatus controlling bootup processes of a computer system, the apparatus comprising:
- a first hard disk drive storing a first operating system;
- a second hard disk drive storing a second operating system;
- a controller having a first terminal and a second terminal, said controller controlling said first and second hard disk drives;
- a switch unit disposed between said controller and said first and second hard disk drives, being coupled to said first and second terminals of said controller, and being coupled to said first and second hard disk drives;
- a system control unit being coupled to said switch unit, transmitting a switching signal to said switch unit during a bootup of the computer system;
- when said switching signal corresponds to a first signal, said switch unit connecting said first terminal of said controller with said second hard disk drive and connecting said second terminal of said controller with said first hard disk drive; and
- when said switching signal does not correspond to said first signal, said switch unit connecting said first terminal of said controller with said first hard disk drive and connecting said second terminal of said controller with said second hard disk drive.

20. The apparatus of claim 19, wherein said second hard disk drive corresponds to a removable media bootable hard disk drive.

21. The apparatus of claim 19, wherein said first operating system does not correspond to said second operating system.

22. The apparatus of claim 19, wherein said switch unit further comprises:
- a plurality of switching blocks, a first switching block selected from among said plurality of switching blocks having a first input terminal, a second input terminal, a first output terminal, and a second output terminal;
- said first switching block having a first transistor coupling said first input terminal and said first output terminal, a second transistor coupling said second input terminal and said second output terminal, a third transistor coupling said second input terminal and said first output terminal, and a fourth transistor coupling said first input terminal and said second output terminal;
- said first transistor having a control electrode receiving a first modified signal corresponding to said switching signal, a first electrode of a principal electrically conducting channel connected to said first input terminal, and a second electrode of a principal electrically conducting channel connected to said first output terminal;
- said second transistor having a control electrode receiving said first modified signal corresponding to said switching signal, a first electrode of a principal electrically conducting channel connected to said second input terminal, and a second electrode of a principal electrically conducting channel connected to said second output terminal;
- said third transistor having a control electrode receiving a second modified signal corresponding to said switching signal, a first electrode of a principal electrically conducting channel connected to said second input terminal, and a second electrode of a principal electrically conducting channel connected to said first output terminal; and
- said fourth transistor having a control electrode receiving said second modified signal corresponding to said switching signal, a first electrode of a principal electrically conducting channel connected to said first input terminal, and a second electrode of a principal electrically conducting channel connected to said second output terminal.

23. The apparatus of claim 22, wherein said first transistor corresponds to an N-channel metal oxide semiconductor transistor.

24. A method controlling bootup processes of a computer system, the method comprising the steps of:
- detecting power data stored in a basic input output system random access memory of a computer system, said power data corresponding to a power mode selected from among a power-off state and a suspend state, said power-off state corresponding to a low level of power consumption and said suspend state corresponding to an intermediate level of power consumption higher than said low level;
- determining when a first storage unit and a second storage unit are in said power-off state, in accordance with said power data, said first storage unit being coupled to the computer system and storing a first bootable operating system, and said second storage unit being coupled to the computer system and storing a second bootable operating system;
- executing a first bootup selection routine when said first and second storage units are in said power-off state, said first bootup selection routine corresponding to a routine selected from among a first bootup routine utilizing said first bootable operating system stored on said first storage unit and a second bootup routine utilizing said second bootable operating system stored on said second storage unit, said first and second bootup routines transitioning the computer system from said power-off state to a power-on state, said power-on state corresponding to a high level of power consumption higher than said intermediate level;
- determining when said first storage unit is in said power-off state and said second storage unit is in said suspend state, in accordance with said power data;
- executing a second bootup selection routine when said first storage unit is in said power-off state and said second storage unit is in said suspend state, said second bootup selection routine corresponding to a routine selected from among said first bootup routine utilizing said first bootable operating system stored on said first storage unit and a first resume routine utilizing said second bootable operating system stored on said second storage unit, said first resume routine transitioning the computer system from said suspend state to said power-on state;
- determining when said first storage unit is in said suspend state and said second storage unit is in said power-off state, in accordance with said power data; and
- executing a third bootup selection routine when said first storage unit is in said suspend state and said second storage unit is in said power-off state, said third bootup selection routine corresponding to a routine selected from among a second resume routine utilizing said first bootable operating system stored on said first storage unit and said second bootup routine utilizing said second bootable operating system stored on said second storage unit, said second resume routine transitioning the computer system from said suspend state to said power-on state.

25. The method of claim 24, wherein said first storage unit corresponds to a first fixed media bootable hard disk drive.

26. The method of claim 24, wherein said second storage unit corresponds to a first fixed media bootable hard disk drive.

27. The method of claim 24, wherein said second storage unit corresponds to a removable media bootable hard disk drive.

28. The method of claim 24, wherein said step of executing said second bootup selection routine further comprises the substeps of:

prompting a user to select a routine from among said first bootup routine and said first resume routine;

determining when said first bootup routine is selected;

when said first bootup routine is selected, transmitting a low level switching signal and performing said first bootup routine to transition the computer system from said power-off state to said power-on state; and when said first resume routine is selected, transmitting a high level switching signal and performing said first resume routine to transition the computer system from said suspend state to said power-on state.

29. The method of claim 24, wherein said step of executing said third bootup selection routine further comprises the substeps of:

prompting a user to select a routine from among said second resume routine and said second bootup routine;

determining when said second resume routine is selected;

when said second resume routine is selected, transmitting a first switching signal and performing said second resume routine to transition the computer system from said suspend state to said power-on state; and when said second bootup routine is selected, transmitting a second switching signal and performing said second bootup routine to transition the computer system from said power-off state to said power-on state.

30. The method of claim 24, wherein a transitioning of the computer system to said suspend state comprises the steps of:

prompting a user to select a routine from among a first suspend routine and a second suspend routine, said first suspend routine storing data in memory of the computer system to said first storage unit, and said second suspend routine storing data in memory of the computer system to said second storage unit;

determining when the user selects said first suspend routine;

when said first suspend routine is selected, transmitting a first switching signal and setting a state value of said first storage unit to a first state, and performing said first suspend routine; and when said first suspend routine is not selected, transmitting a second switching signal and setting a state value of said second storage unit to said first state, and performing said second suspend routine.

31. The method of claim 24, wherein said step of executing said second bootup selection routine further comprises the substeps of:

prompting a user to select a routine from among said first bootup routine and said first resume routine;

determining when said first bootup routine is selected;

when said first bootup routine is selected, transmitting a first switching signal and performing said first bootup routine to transition the computer system to said power-on state; and when said first bootup routine is not selected, transmitting a second switching signal and performing said first resume routine to transition the computer system to said power-on state.

32. The method of claim 31, wherein said first switching signal corresponds to a low level signal and said second switching signal corresponds to a high level signal.

* * * * *